(12) United States Patent
Abram

(10) Patent No.: US 10,662,838 B2
(45) Date of Patent: May 26, 2020

(54) EXHAUST SYSTEM SPRING WITH TORSIONAL DAMPING

(71) Applicant: FAURECIA EMISSIONS CONTROL TECHNOLOGIES, USA, LLC, Columbus, IN (US)

(72) Inventor: Kwin Abram, Columbus, IN (US)

(73) Assignee: FAURECIA EMISSIONS CONTROL TECHNOLOGIES, USA, LLC, Columbus, IN (US)

( * ) Notice: Subject to any disclaimer, the term of this patent is extended or adjusted under 35 U.S.C. 154(b) by 259 days.

(21) Appl. No.: 15/120,187

(22) PCT Filed: Mar. 14, 2014

(86) PCT No.: PCT/US2014/026991
§ 371 (c)(1),
(2) Date: Aug. 19, 2016

(87) PCT Pub. No.: WO2015/137957
PCT Pub. Date: Sep. 17, 2015

(65) Prior Publication Data
US 2017/0074135 A1 Mar. 16, 2017

(51) Int. Cl.
*F01N 1/16* (2006.01)
*F01N 1/18* (2006.01)
(Continued)

(52) U.S. Cl.
CPC ............. *F01N 1/165* (2013.01); *F01N 1/18* (2013.01); *F01N 13/08* (2013.01); *F01N 13/16* (2013.01);
(Continued)

(58) Field of Classification Search
CPC . F01N 1/165; F01N 1/18; F01N 13/16; F01N 13/08; F01N 2260/14; F01N 2240/36; F01N 2290/10; F01N 1/16; F01N 2290/08; F16K 15/033; F16K 17/0433; F16F 2236/08; F16F 15/1337
(Continued)

(56) References Cited

U.S. PATENT DOCUMENTS 2,703,234 A * 3/1955 Tapp ........................ F16F 1/13
267/287
3,326,545 A * 6/1967 Bache .................... B60G 17/00
267/287
(Continued)

FOREIGN PATENT DOCUMENTS

| JP | 2008196405 A | 8/2008 |
| JP | 2011069251 A | 4/2011 |
| JP | 2012036887 A | 2/2012 |

OTHER PUBLICATIONS

International Search Report for PCT US2014/026991, dated Nov. 21, 2014.

*Primary Examiner* — Craig J Price
*Assistant Examiner* — Andrew J Rost
(74) *Attorney, Agent, or Firm* — Carlson, Gaskey & Olds, P.C.

(57) ABSTRACT

An adaptive valve assembly includes a pipe defining a passageway for conducting engine exhaust gases, a pivot shaft supported by the pipe, and a valve body coupled to the pivot shaft. The valve body is moveable between an open position where exhaust gas flow through the passageway is increased and a closed position where exhaust gas flow through the passageway is reduced. A spring biases the valve body toward the closed position. The spring includes a plurality of coils that have torsional displacement relative to each other as the valve body moves between the open and closed positions. A torsional damper feature is associated with at least one coil of the plurality of coils to provide torsional spring damping.

26 Claims, 5 Drawing Sheets

(51) Int. Cl.
*F16K 15/03* (2006.01)
*F01N 13/16* (2010.01)
*F01N 13/08* (2010.01)
*F16K 17/04* (2006.01)

(52) U.S. Cl.
CPC ........ *F16K 15/033* (2013.01); *F16K 17/0433* (2013.01); *F01N 2240/36* (2013.01); *F01N 2260/14* (2013.01); *F01N 2290/10* (2013.01)

(58) Field of Classification Search
USPC ......... 267/90, 166, 180, 287, 286, 275, 154, 267/155, 157
See application file for complete search history.

(56) References Cited

U.S. PATENT DOCUMENTS

| | | | | |
|---|---|---|---|---|
| 3,622,142 | A * | 11/1971 | Lorio | F16F 1/13 267/287 |
| 3,773,309 | A * | 11/1973 | Carter | F16F 1/13 267/287 |
| 4,551,120 | A * | 11/1985 | Thomey | F16H 7/1281 474/112 |
| 4,614,333 | A * | 9/1986 | Gaylord | F16F 1/13 267/152 |
| 4,810,231 | A * | 3/1989 | Weissenberger | F16F 1/043 192/203 |
| 5,709,241 | A * | 1/1998 | Iwata | F01N 1/02 137/527 |
| 6,918,374 | B1 * | 7/2005 | Kurita | F02D 9/02 123/337 |
| 7,051,707 | B2 * | 5/2006 | Tanimura | F02D 9/1065 123/361 |
| 7,503,309 | B2 * | 3/2009 | Tanimura | F02D 41/107 123/396 |
| 8,448,627 | B2 * | 5/2013 | Kondo | F02D 9/105 123/361 |
| 2008/0236680 | A1 | 10/2008 | Abram et al. | |
| 2013/0232961 | A1 | 9/2013 | Abram | |

* cited by examiner

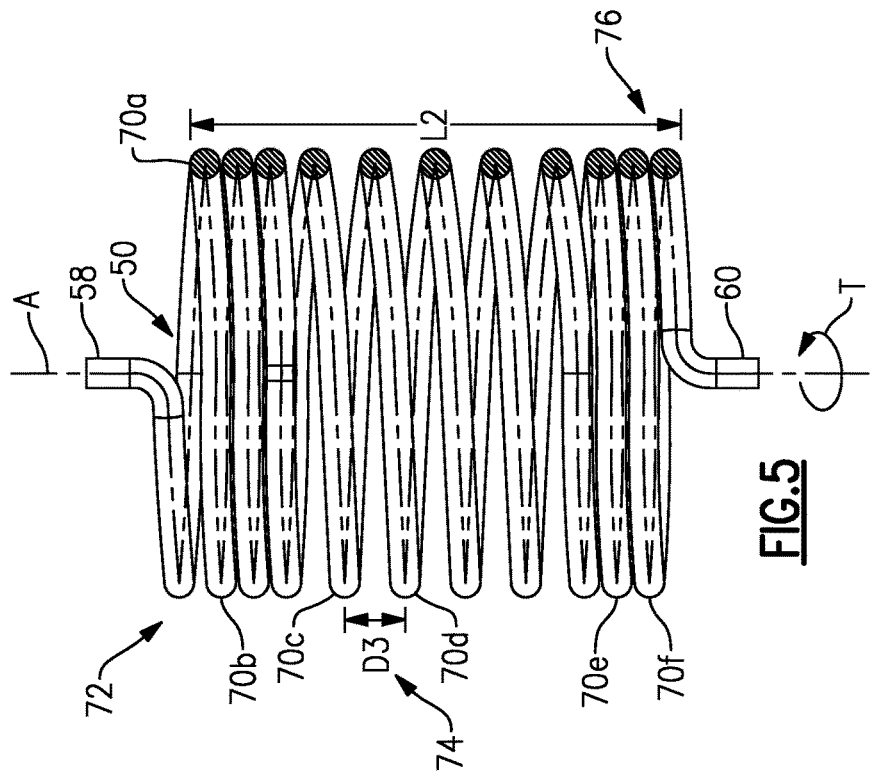
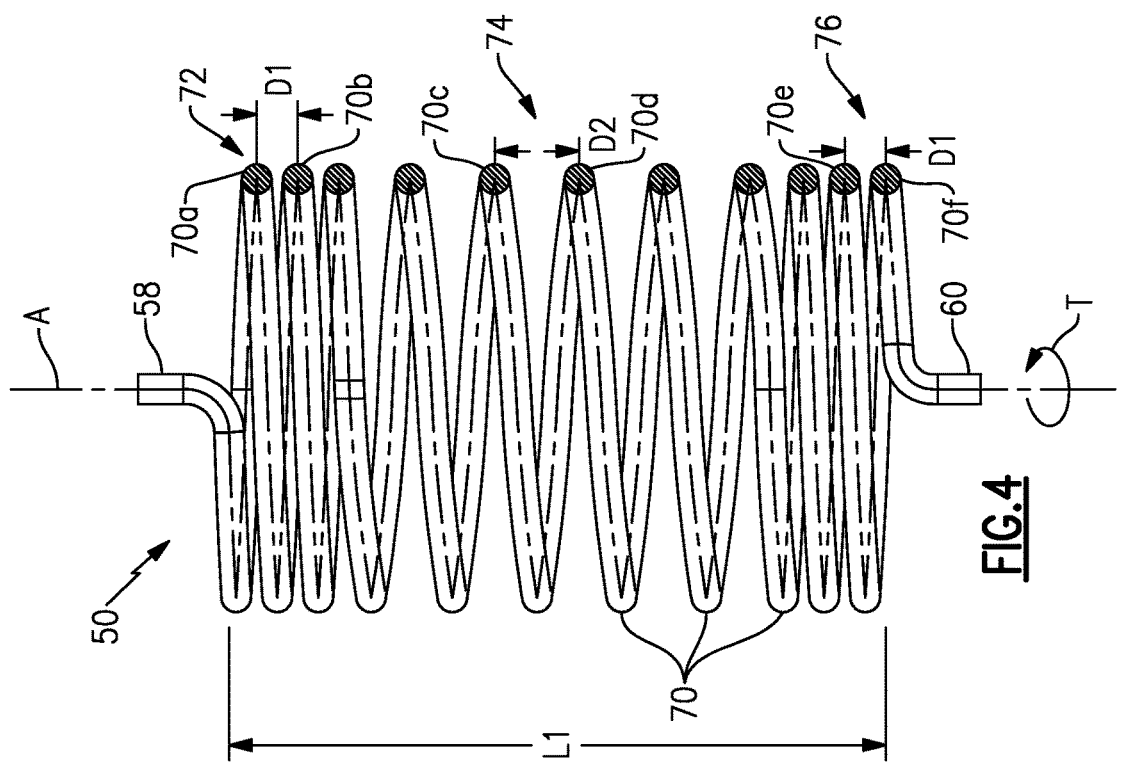

EXHAUST SYSTEM SPRING WITH TORSIONAL DAMPING

TECHNICAL FIELD

The subject invention relates to an adaptive valve assembly for a vehicle exhaust system that uses a spring with a torsional damper.

BACKGROUND OF THE INVENTION

Exhaust systems are widely known and used with combustion engines. Typically, an exhaust system includes exhaust tubes or pipes that convey hot exhaust gases from the engine to other exhaust system components, such as mufflers, resonators, etc. Mufflers and resonators include acoustic chambers that cancel out sound waves carried by the exhaust gases. Although effective, these components are often relatively large in size and provide limited nose attenuation.

One solution for reducing low frequency noise is to use an adaptive/passive valve assembly. The passive valve assembly includes a flapper valve body or vane that is positioned within an exhaust pipe where the vane is pivotable between an open position and a closed position. The passive valve is spring biased toward the closed position, and when exhaust gas pressure is sufficient to overcome this spring bias, the vane is pivoted toward the open position. When the exhaust gas pressure falls, the spring returns the vane to the closed position. As the vane moves back and forth between the open and closed positions, spring coils have relative torsional displacement relative to each other.

With the use of the spring, it is difficult to return the vane to a consistent closed position within the exhaust pipe. Further, while effective at attenuating low frequency noise, the introduction of the passive valve into the exhaust system presents additional noise challenges. For example, the spring of the valve assembly can generate an undesirable chattering noise, especially when in the closed or idling position. In this position, the valve can flutter slightly back and forth due to small fluctuations in exhaust gas flow creating an undesirable torsional flutter condition.

SUMMARY OF THE INVENTION

According to one exemplary embodiment, an adaptive valve assembly includes a pipe defining a passageway for conducting engine exhaust gases, a pivot shaft supported by the pipe, and a valve body coupled to the pivot shaft. The valve body is moveable between an open position where exhaust gas flow through the passageway is increased and a closed position where exhaust gas flow through the passageway is reduced. A spring biases the valve body toward the closed position. The spring includes a plurality of coils that have torsional displacement relative to each other as the valve body moves between the open and closed positions. A torsional damper feature is associated with at least one coil of the plurality of coils to provide torsional spring damping.

In another embodiment according to the previous embodiment, the plurality of coils includes at least a first set of at least two adjacent coils that are spaced apart from each other by a first distance and a second set of at least two adjacent coils that are spaced apart from each other by a second distance that is greater than the first distance.

In another embodiment according to any of the previous embodiments, the spring has a first spring end fixed to a non-rotating structure and a second spring end configured for rotation with said pivot shaft, and wherein the first set of at least two adjacent coils is positioned adjacent at least one of the first and second spring ends, and wherein the second set of at least two adjacent coils is positioned at a location that is spaced apart from the first and second spring ends.

In another embodiment according to any of the previous embodiments, the spring comprises a pre-installation configuration and a post-installation configuration, and wherein when in the pre-installation condition the at least two adjacent coils of the first set are spaced apart from each other by the first distance, and wherein when in the post-installation condition the at least two adjacent coils of the first set are in contact with each other to provide the torsional damper feature.

In another embodiment according to any of the previous embodiments, wherein when in the post-installation configuration, the at least two adjacent coils of the second set remain spaced apart from each other while the at least two adjacent coils of the first set are in contact with each other.

In another embodiment according to any of the previous embodiments, the torsional damper feature comprises at least one piece of damping material that is positioned directly between and in contact with at least two adjacent coils of the plurality of coils.

In another embodiment according to any of the previous embodiments, wherein the at least one piece of damping material is comprised of a silicon material.

BRIEF DESCRIPTION OF THE DRAWINGS

FIG. 4 is a top view of a spring with torsional damping in the pre-installation configuration.

FIG. 5 is a view similar to FIG. 4 but showing a post-installation configuration.

DETAILED DESCRIPTION

Figure 1:
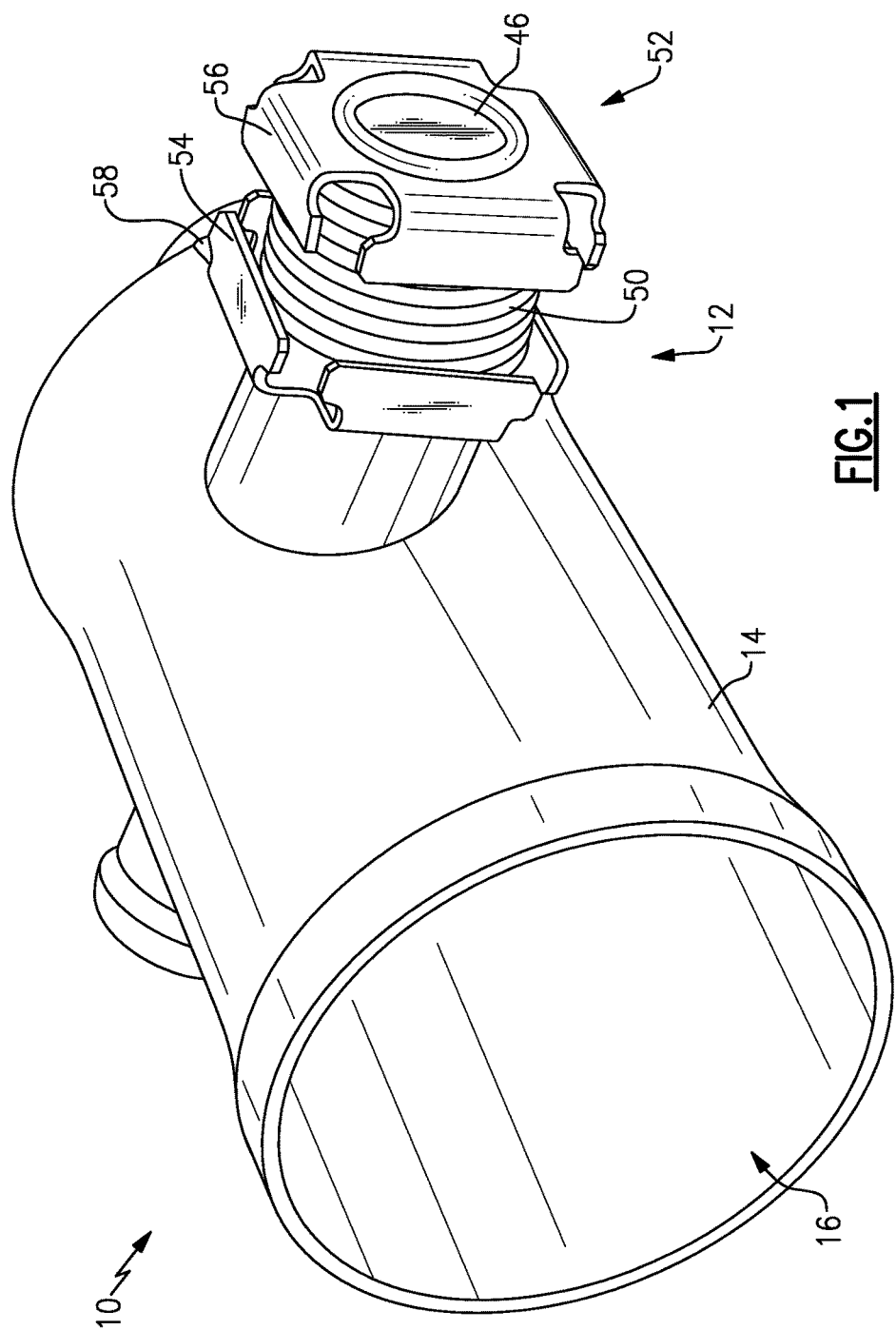
FIG. 1 is a perspective view of a vehicle exhaust component incorporating a passive valve assembly.
Figure 2:
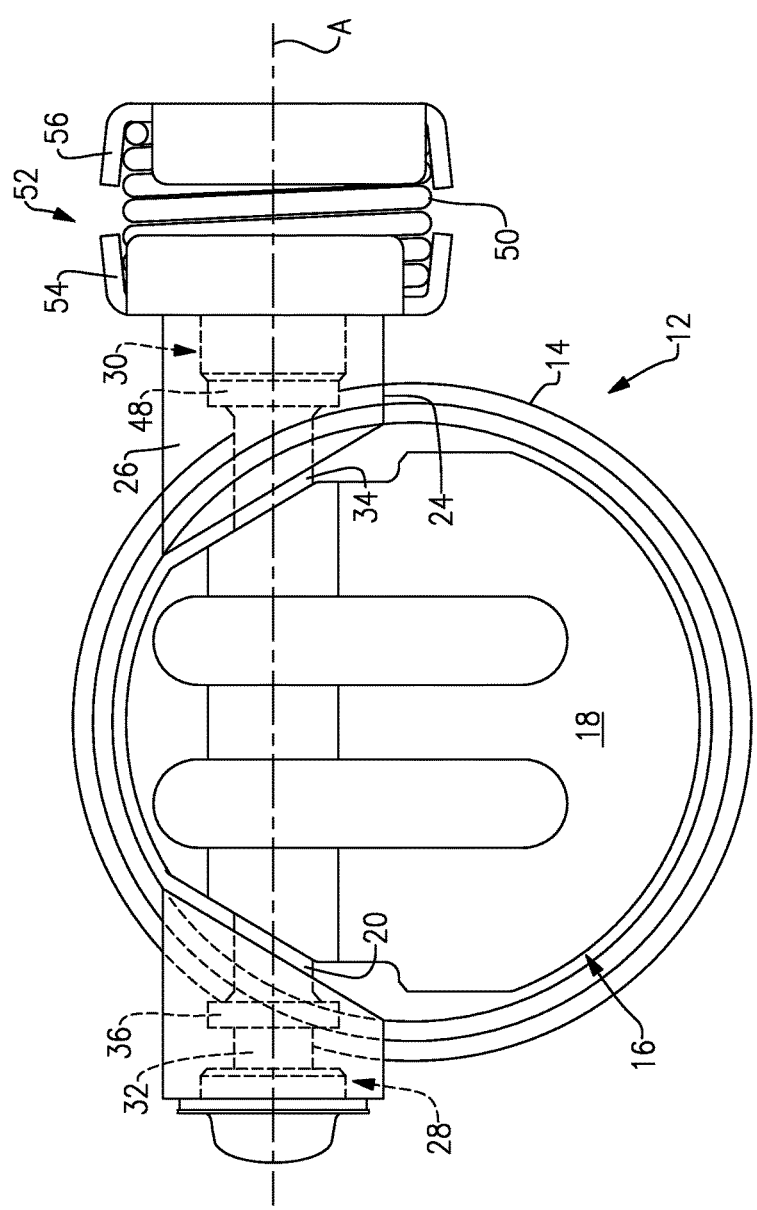
FIG. 2 is a front view, in partial section, of the component of FIG. 1.

FIGS. 1-2 show an exhaust component 10 that includes an adaptive exhaust valve assembly 12 that is movable between an open position and a closed position. In the example shown, the exhaust component 10 comprises pipe or a tube body 14 that defines an exhaust gas flow path 16. The exhaust valve assembly 12 includes a valve body 18 that blocks at least a substantial portion of the exhaust gas flow path 16 when in the closed position and is pivoted toward the open position to minimize blockage.

In one example, the valve body 18 (FIG. 2) is fixed to rotate with a pivot shaft 20 about an axis A. In one example, an opening 24 is formed within an outer surface of the tube body 14. A housing 26 is received within this opening 24 and is welded to the tube body 14. Other housing configurations with other shapes and mounting configurations could also be used. The shaft 20 is rotatably supported within the housing 26 by first 28 and second 30 bushings.

The first bushing 28 is positioned generally at a first shaft end 32 as shown in FIG. 2. The first bushing 28 comprises a sealed interface for the first shaft end 32. The shaft 20 includes a shaft body 34 with a first collar 36 near the first shaft end 32. The first bushing 28 includes a bore that receives the first shaft end 32.

The second bushing 30 includes a bore through which the shaft body 34 extends to a second shaft end 46. The shaft 20 includes a second collar 48 that is located axially inboard of the second bushing 30.

The shaft 20 extends through the bore to an axially outboard position relative to the second bushing 30. A resilient member, such as a spring 50 for example, is coupled to the second shaft end 46 with a retainer assembly 52. The retainer assembly 52 includes a first retainer piece 54 that is fixed to the housing 26 or pipe body and a second retainer piece 56 that rotates with the shaft 20. One spring end 58 is fixed to a non-rotating structure, such as the first retainer piece 54 for example, and a second spring end 60 (FIG. 4) is configured to rotate with the shaft 20.

Figure 3:
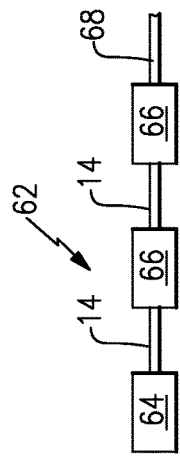
FIG. 3 is a schematic view of a vehicle exhaust system in which the exhaust component of FIG. 1 is utilized.

The subject pipe 14 and passive valve assembly 12 is utilized within a vehicle exhaust system 62 (FIG. 3) that conducts hot exhaust gases generated by an engine 64 through various exhaust components 66 to reduce emission and control noise as known. The various exhaust components 66 can include diesel oxidation catalysts (DOC), selective catalytic reduction (SCR) catalysts, particulate filters, mufflers, additional exhaust pipes, etc. These components 66 can be mounted in various different configurations and combinations dependent upon vehicle application and available packaging space. Engine exhaust gases go through the components 66 and exit to the atmosphere via a tailpipe 68. The pipe 14 and valve assembly 12 can be located anywhere within the exhaust system 62 as needed.

The valve assembly 12 includes a torsional damping feature that is used to reduce the risk of torsional flutter conditions. As will be discussed in greater detail below, the torsional damping feature is incorporated into and/or associated with the spring 50. The valve assembly 12 shown in FIGS. 1-2 is just one example configuration, and it should be understood that the spring 50 with the torsional damping feature could be used with various different valve configurations as needed.

As shown in FIGS. 4-5, the spring 50 comprises a coil spring with a plurality of coils 70. The spring 50 is configured to be compressed both in an axial direction along axis A and in a torsional direction T about axis A during installation. The axial force serves to positively seat and seal the second collar 48 against an end face of the second bushing 30 (FIG. 2). This prevents any exhaust gas from leaking out of the second bushing 30 by sealing off a passage between an outer surface of the shaft 20 and a bore surface of the second bushing 30. Thus, a single spring is used to provide both axial and torsional loading, resulting in a configuration that can both hold the exhaust valve assembly 12 in a desired operational position as well as preventing exhaust gas leakage.

Torsional loading creates a preload force that biases the shaft 20 and the valve body 18 toward the closed position. As gas flow increases, this torsional force is overcome to move the valve body 18 toward the open position. As the valve body 18 moves back and forth between the open and closed positions, the spring coils 70 have torsional displacement relative to each other. Under certain conditions, the valve body 18 can flutter slightly back and forth due to small fluctuations in exhaust gas flow creating an undesirable torsional flutter condition.

The valve body 18 can only move toward the open position in response to an exhaust gas pressure force that overcomes the biasing force of the spring 50. In other words, the valve comprises a passive valve as opposed to an actively controlled valve where a controller is used to actively move the valve body to a desired valve position. Thus, movement of the valve body 18 is solely controlled by the force of the spring 50 and the exhaust gas pressure force.

As discussed above, the spring 50 is associated with a retainer assembly 52. The retainer 52 includes a first retainer piece 54 that is fixed to a non-rotating structure such as the housing 26 or tube body 14, for example, and a second retainer piece 56 that is fixed to the second shaft end 46. In one example, the first retainer piece 54 is secured to the non-rotating structure by welding; however, other attachment methods could also be used such as brazing, high temperature adhesive, or any other suitable attachment method. The second retainer piece 56 can be secured to the pivot shaft 20 by a fastener or any other attachment method.

The valve assembly 12 includes a torsional damper feature associated with one or more coils 70 of the plurality of coils 70 to provide torsional spring damping. As shown in FIG. 4, the coils 70 include at least a first set 72 of at least two adjacent coils 70a, 70b that are in contact with each other or are spaced apart from each other by a first distance D1 and a second set 74 of at least two adjacent coils 70c, 70d that are spaced apart from each other by a second distance D2 that is greater than the first distance D1.

In the example shown, the spring 50 has a first spring end 58 which is configured to be fixed to a non-rotating structure and a second spring end 60 configured for rotation with the pivot shaft 20. The first set 72 of adjacent coils 70a, 70b is positioned adjacent to at least one of the first 58 and second 60 spring ends. The second set 74 of adjacent coils 70c, 70d is positioned at a location that is spaced apart from the first 58 and second 60 spring ends. While each set 72, 74 is described as including two adjacent coils, it should be understood that either one or both of the sets 72, 74 may include additional coils as needed.

In one example, the second set 74 of at least two adjacent coils 70c, 70d is generally centrally located on the spring 50. The second set 74 may be positioned at a distance that is generally equal distance from each spring end 58, 60.

In one example configuration, the first set 72 of coils 70a, 70b is positioned at the first spring end 58. The spring 50 includes an additional set 76 of at least two additional coils 70e, 70f that are spaced apart from each other by the first distance D1. The additional set 76 of coils 70e, 70f is positioned at the second spring end 60. Thus, there are two closely spaced sets of coils at the spring ends and a more widely spaced set of coils near the center of the spring.

The configuration shown in FIG. 4 comprises a pre-installation configuration where the spring 50 has an overall length of L1. FIG. 5 shows a post-installation configuration having an overall length L2 that is less than L1. When in the pre-installation condition the coils 70a, 70b of the first set 72 and coils 70e, 70f of the additional set 76 are spaced apart from each other by the first distance D1, and when in the post-installation condition, at least a portion of the coils 70a, 70b of the first set 72 and/or the coils 70e, 70f of the additional set 76 are in contact with each other to provide the torsional damper feature. In other words, once installed, the first distance D1 is reduced to zero or close thereto.

When in the post-installation configuration the coils 70c, 70d of the second set 74 remain spaced apart from each other while the coils 70a, 70b of the first set 72 are in contact with each other, as well as the coils 70e, 70f of the additional set 76 being in contact with each other. Further, when in the post-installation configuration, the coils 70c, 70d of the second set 74 are spaced apart from each other by a third distance D3 that is less than the second distance D2. As discussed above, the first set 72 of coils 70a, 70b is positioned immediately at the first spring end 58 and the additional set 76 of coils 70e, 70f is positioned immediately at the second spring end 60.

In another example shown in FIGS. 6-10, the torsional damper feature comprises at least one piece of damping material 80 that is positioned directly between and in contact with at least two adjacent coils 70 of the spring 50. This configuration can be used in combination with the spring having torsional coil contact damping shown in FIGS. 4-5, or can be used by itself with other spring configurations.

Figure 6:
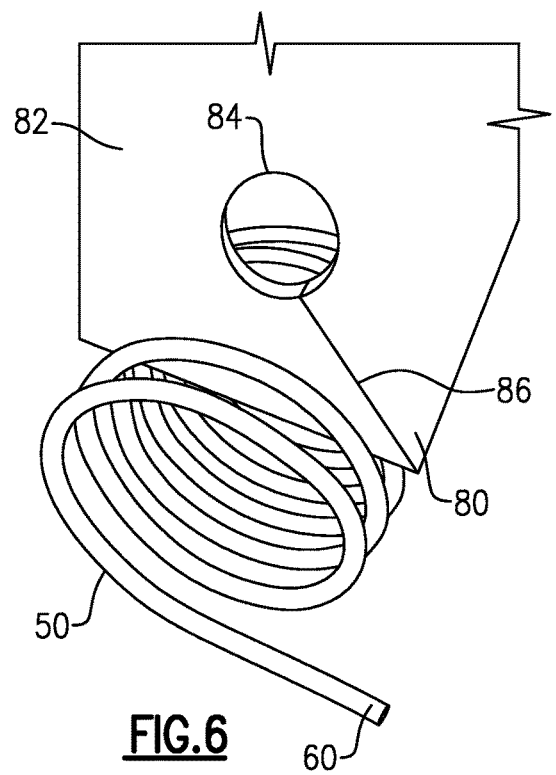
FIG. 6 is a perspective end view of another embodiment of a torsional damper.
Figure 10:
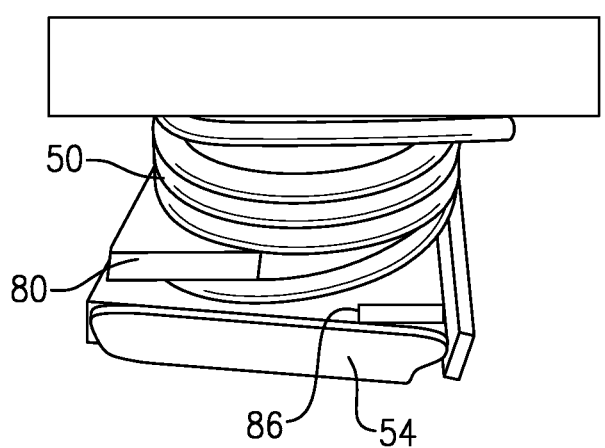
FIG. 10 is a side view of the spring and shows one example of an alternate location of the torsional damper.

In the example shown in FIG. 6, the at least one piece of damping material 80 comprises a block of material 82 with a center opening 84 having a slit 86 extending to the edge such that slit edges can be separated as shown in FIG. 10.

Figure 7:
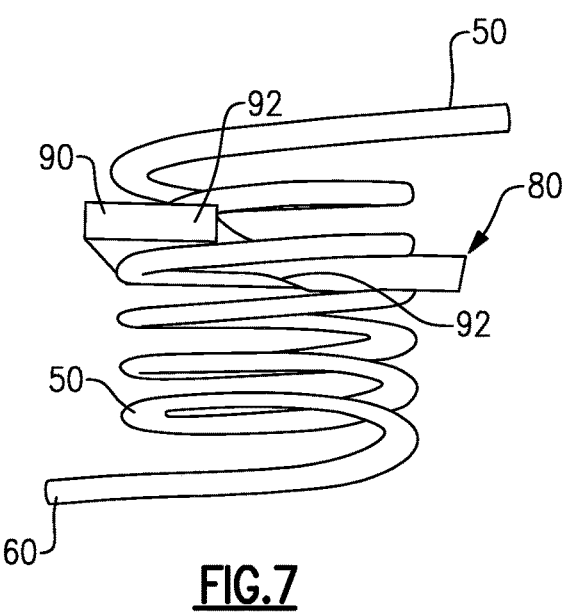
FIG. 7 is a side view of the spring and torsional damper of FIG. 6 with the spring in the pre-installation position.
Figure 8:
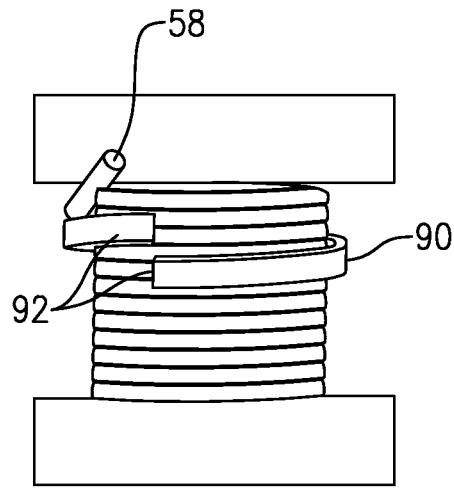
FIG. 8 is a side view of the spring and torsional damper of FIG. 6 with the spring in the post-installation position.

In another example, the damping material 80 comprises a split ring 90 with spaced apart edges 92 (FIGS. 7-8).

One preferred material for the damper material 80 in either configuration is a resilient material, such as a silicon material for example.

Figure 9:
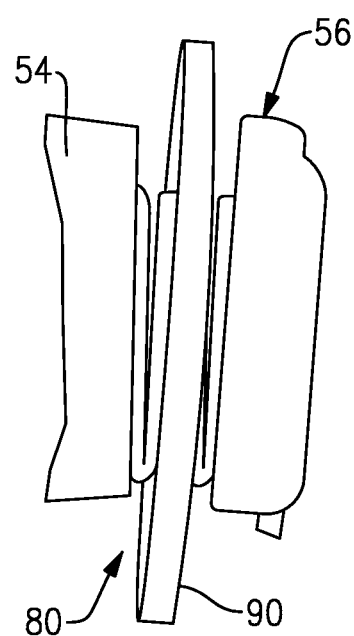
FIG. 9 is a side view of the spring and torsional damper as installed in a spring retainer.

FIG. 6 shows the damping material 80 being inserted between adjacent coils 70. FIG. 7 shows the split ring 90 installed in the spring 50 when the spring 50 is in the pre-installation position. FIG. 8 is a side view of the spring 50 and torsional damper with the spring 50 in the post-installation position. FIG. 9 is a side view of the spring 50 and torsional damper as installed in a spring retainer 54, 56.

FIG. 10 is a side view of the spring 50 and shows one example of an alternate location of the torsional damper formed of damping material 80. In this example, the damping material 80 is located adjacent one of the spring ends 58, 60.

The subject invention uses coil-to-coil interaction and/or damping material installed between two adjacent coils of an exhaust spring to reduce adverse vibrational effects generated during operation of the vehicle exhaust system. Such effects include rotational flutter and valve chatter, for example. As discussed above, in the coil-to-coil interaction configuration the coils 70 do not touch each other in a pre-assembly condition. This allows for quality control check. One or more sets 72, 76 of closely or more narrowly wound coils (D1=approximately 1 mm gap, for example) will collapse during assembly and subsequently touch each other to provide the desired damping. The wider gaps, i.e. D2 at pre-installation, for the second set 74 of coils will maintain a post-installation spacing, i.e. D3, to provide proper axial resilience which is important for shaft-to-bearing sealing interaction.

In the configuration where damping material 80 is positioned between two adjacent coils damping is provided to reduce both spring rattle and torsional valve flutter. When the spring 50 is compressed, the damping material 80 is compressed or pinched between two coils 70. This adds damping to suppress the valve's torsional activity and reduces torsional flutter conditions.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An adaptive valve assembly comprising:
   a pipe defining a passageway configured to conduct engine exhaust gases;
   a pivot shaft supported by the pipe;
   a valve body coupled to the pivot shaft to rotate about an axis, the valve body moveable between an open position where exhaust gas flow through the passageway is increased and a closed position where exhaust gas flow through the passageway is reduced;
   a spring biasing the valve body to the closed position such that the valve body can only move toward the open position in response to an exhaust gas pressure force that overcomes a biasing force of the spring, the spring comprised of a plurality of coils concentric with the axis and that have torsional displacement relative to each other as the valve body moves between the open and closed positions; and
   a torsional damper feature comprising coil-to-coil interaction of the plurality of coils to provide torsional spring damping.

2. The adaptive valve assembly according to claim 1 wherein, when in a pre-installation configuration, the plurality of coils includes at least a first set of at least two adjacent coils that are spaced apart from each other by a first distance and a second set of at least two adjacent coils that are spaced apart from each other by a second distance that is greater than the first distance.

3. The adaptive valve assembly according to claim 2 wherein the spring has a first spring end fixed to a non-rotating structure and a second spring end configured for rotation with said pivot shaft, and wherein the first set of at least two adjacent coils is positioned adjacent at least one of the first and second spring ends, and wherein the second set of at least two adjacent coils is positioned at a location that is spaced apart from the first and second spring ends.

4. The adaptive valve assembly according to claim 3 wherein the second set of at least two adjacent coils is centrally located on the spring.

5. The adaptive valve assembly according to claim 3 wherein the first set of at least two adjacent coils is positioned at the first spring end, and including an additional set of at least two adjacent coils that are spaced apart from each other by the first distance, the additional set of at least two adjacent coils being positioned at the second spring end.

6. The adaptive valve assembly according to claim 5 wherein the first and second sets of at least two adjacent coils, and the additional set of at least two adjacent coils, are concentric with the axis in the pre-installation condition and the post-installation condition.

7. The adaptive valve assembly according to claim 3 wherein the spring comprises the pre-installation configuration and a post-installation configuration, and wherein when in a post-installation configuration the at least two adjacent coils of the first set are in contact with each other to provide the torsional damper feature.

8. The adaptive valve assembly according to claim 7 wherein when in the post-installation configuration the at least two adjacent coils of the second set remain spaced apart from each other while the at least two adjacent coils of the first set are in contact with each other.

9. The adaptive valve assembly according to claim 8 wherein the at least two adjacent coils of the second set are spaced apart from each other by the second distance when in the pre-installation configuration, and wherein, when in the post-installation configuration, the at least two adjacent coils of the second set are spaced apart from each other by a third distance that is less than the second distance.

10. The adaptive valve assembly according to claim 9 wherein the first set of at least two coils is positioned immediately at the first spring end, and including an additional set of at least two adjacent coils that are in contact with each other when in the post-installation configuration, the additional set of at least two adjacent coils being positioned immediately at the second spring end.

11. The adaptive valve assembly according to claim 10 wherein the second set of at least two adjacent coils is positioned generally centrally along the spring.

12. The adaptive valve assembly according to claim 3 wherein the torsional damper feature comprises at least one piece of damping material that is positioned directly between, and in contact with, at least two adjacent coils of the plurality of coils.

13. The adaptive valve assembly according to claim 1 wherein movement of the valve body is solely controlled by the spring and exhaust gas flow.

14. The adaptive valve assembly according to claim 1 wherein the plurality of coils includes at least a first set of at least two adjacent coils and a second set of at least two adjacent coils, and wherein the at least two adjacent coils of the first set are in contact with each other or spaced apart from each other by a first distance when in a pre-installation condition, and wherein the at least two adjacent coils of the second set are spaced apart from each other by a second distance when in the pre-installation condition.

15. The adaptive valve assembly according to claim 14 wherein the second distance is greater than the first distance.

16. The adaptive valve assembly according to claim 15 wherein the at least two adjacent coils of the second set are spaced apart from each other by a third distance when in a post-installation condition, the third distance being less than the second distance.

17. The adaptive valve assembly according to claim 16 wherein the first and second sets of at least two adjacent coils are concentric with the axis in the pre-installation condition and the post-installation condition.

18. The adaptive valve assembly according to claim 1 wherein the valve assembly comprises a passive valve and wherein movement of the valve body to a fully open positioned is solely in response to the exhaust gas pressure force overcoming the biasing force of the spring.

19. The adaptive valve assembly according to claim 1 wherein the closed position comprises a minimum flow position and the open position comprises a maximum flow position and wherein the spring biases the valve body to the closed position and the valve body can only move to the open position in response to the exhaust gas pressure force overcoming the biasing force of the spring.

20. The adaptive valve assembly according to claim 1 wherein the spring is configured to be compressed both in an axial direction along the axis and in a torsional direction about the axis during installation, and wherein the spring has a first spring end which is configured to be fixed to a non-rotating structure and a second spring end fixed for rotation with the pivot shaft, and wherein the plurality of coils from the first spring end to the second spring end are rotated in the same torsional direction about the axis, and wherein compression of the spring in the axial direction provides an axial force that positively seats and seals the shaft against a bushing that rotatably supports the pivot shaft.

21. An adaptive valve assembly comprising:
a pipe defining a passageway configured to conduct engine exhaust gases;
a pivot shaft supported by the pipe;
a valve body coupled to the pivot shaft to rotate about an axis, the valve body moveable between an open position where exhaust gas flow through the passageway is increased and a closed position where exhaust gas flow through the passageway is reduced;
a spring biasing the valve body to the closed position such that the valve body can only move toward the open position in response to an exhaust gas pressure force that overcomes a biasing force of the spring, the spring comprised of a plurality of coils that have torsional displacement relative to each other as the valve body moves between the open and closed positions; and
a torsional damper feature associated with the plurality of coils to provide torsional spring damping, wherein the torsional damper feature comprises at least one piece of damping material having a body with a center opening and a slit extending to an edge of the body such that first and second slit edges are spaced apart from each other in an axial direction, and wherein the first slit edge is positioned directly between, and in contact with, at least two first adjacent coils of the plurality of coils and the second slit edge is positioned directly between, and in contact with, at least two second adjacent coils of the plurality of coils.

22. The adaptive valve assembly according to claim 21 wherein the at least one piece of damping material is comprised of a silicon material.

23. The adaptive valve assembly according to claim 21 wherein the at least one piece of damping material comprises a split ring of resilient material.

24. The adaptive valve assembly according to claim 21 wherein the valve assembly comprises a passive valve and wherein movement of the valve body to a fully open positioned is solely in response to the exhaust gas pressure force overcoming the biasing force of the spring.

25. The adaptive valve assembly according to claim 21 wherein the closed position comprises a minimum flow position and the open position comprises a maximum flow position and wherein the spring biases the valve body to the closed position and the valve body can only move to the open position in response to the exhaust gas pressure force overcoming the biasing force of the spring.

26. The adaptive valve assembly according to claim 21 wherein the spring is configured to be compressed both in an axial direction along the axis and in a torsional direction about the axis during installation, and wherein the spring has a first spring end which is configured to be fixed to a non-rotating structure and a second spring end fixed for rotation with the pivot shaft, and wherein the plurality of coils from the first spring end to the second spring end are rotated in the same torsional direction about the axis, and wherein compression of the spring in the axial direction provides an axial force that positively seats and seals the shaft against a bushing that rotatably supports the pivot shaft.

* * * * *